United States Patent
Beauquet et al.

(10) Patent No.: US 12,145,477 B2
(45) Date of Patent: Nov. 19, 2024

(54) SLIDER FOR VEHICLE SEAT, SLIDER DEVICE, VEHICLE SEAT ASSEMBLY AND MOTOR VEHICLE

(71) Applicant: FAURECIA Sièges d'Automobile, Nanterre (FR)

(72) Inventors: Pierre Beauquet, Caen (FR); Bertrand Touzet, Pollhagen (DE)

(73) Assignee: FAURECIA Sièges d'Automobile, Nanterre (FR)

( * ) Notice: Subject to any disclaimer, the term of this patent is extended or adjusted under 35 U.S.C. 154(b) by 176 days.

(21) Appl. No.: 17/870,176

(22) Filed: Jul. 21, 2022

(65) Prior Publication Data

US 2023/0023433 A1   Jan. 26, 2023

(30) Foreign Application Priority Data

Jul. 23, 2021 (FR) ...................................... 2108038

(51) Int. Cl.
*B60N 2/06* (2006.01)
*B60N 2/07* (2006.01)

(52) U.S. Cl.
CPC ........... *B60N 2/067* (2013.01); *B60N 2/0705* (2013.01)

(58) Field of Classification Search
CPC .............................. B60N 2/067; B60N 2/0705
See application file for complete search history.

(56) References Cited

U.S. PATENT DOCUMENTS

| | | | |
|---|---|---|---|
| 4,511,348 A | 4/1985 | Witdoek | |
| 7,367,908 B2 | 5/2008 | Lemberger | |
| 10,994,637 B2 | 5/2021 | Ogasawara | |
| 2004/0155168 A1 | 8/2004 | Matsushiro | |
| 2016/0144404 A1* | 5/2016 | Houston | H02K 33/00 |
| | | | 318/114 |
| 2018/0215287 A1 | 8/2018 | Koop | |
| 2019/0046373 A1* | 2/2019 | Coulter | H04W 12/50 |
| 2020/0086767 A1 | 3/2020 | Ogasawara | |
| 2020/0356173 A1* | 11/2020 | Bajaj | G08B 6/00 |
| 2021/0121915 A1* | 4/2021 | Delson | H02K 7/061 |
| 2021/0206303 A1* | 7/2021 | Petit | B60N 2/0252 |
| 2022/0017039 A1* | 1/2022 | Hammadi | B60R 22/26 |

(Continued)

FOREIGN PATENT DOCUMENTS

| | | |
|---|---|---|
| DE | 102017101996 | 8/2018 |
| DE | 102019103476 A1 | 6/2020 |

(Continued)

*Primary Examiner* — Mark R Wendell

(74) *Attorney, Agent, or Firm* — Barnes & Thornburg LLP

(57) ABSTRACT

A slider for a vehicle seat, in particular for a motor vehicle seat, comprises a first profile section and a second profile section, the first profile section being movable in translation along a longitudinal direction of the seat, relative to the second profile section, the second profile section being intended to be fixed, under a floor of a vehicle passenger compartment; a slider actuator controlling the movement of the first profile section relative to the second profile section, the slider actuator comprising a motor intended to be arranged above the floor of the vehicle passenger compartment, and a reduction mechanism. The reduction mechanism comprises a belt, preferably notched, intended to pass through a slot in the floor of the vehicle passenger compartment.

19 Claims, 10 Drawing Sheets

(56) References Cited

U.S. PATENT DOCUMENTS

Figure 1:
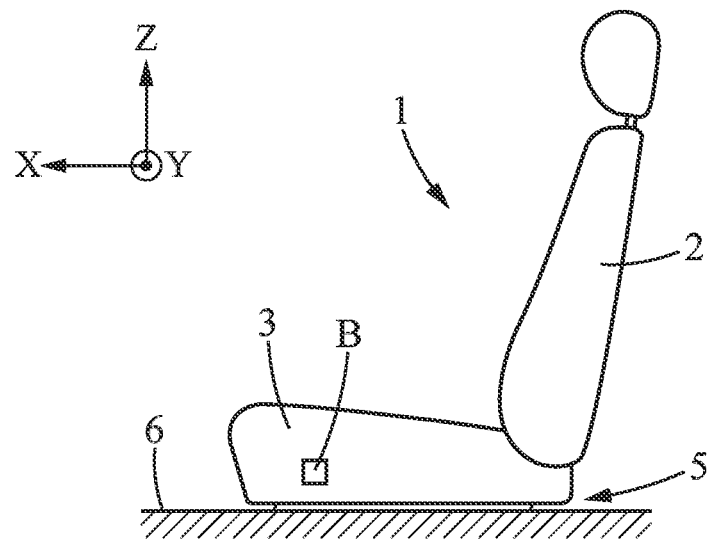

| | | |
|---|---|---|
| 2022/0048409 A1 | 2/2022 | Sprenger |
| 2022/0144147 A1 | 5/2022 | Zhang |
| 2023/0014786 A1 | 1/2023 | Kim |

FOREIGN PATENT DOCUMENTS

| | | |
|---|---|---|
| EP | 4119391 | 1/2023 |
| WO | 2011143173 A1 | 11/2011 |
| WO | 2020164328 A1 | 8/2020 |
| WO | 2022173243 | 8/2022 |

* cited by examiner

SLIDER FOR VEHICLE SEAT, SLIDER DEVICE, VEHICLE SEAT ASSEMBLY AND MOTOR VEHICLE

PRIORITY CLAIM

This application claims priority to French Patent Application No. FR2108038, filed Jul. 23, 2021, which is expressly incorporated by reference herein.

BACKGROUND

The present disclosure relates to a slider for a vehicle seat, and to a slider device comprising such a slider. The present disclosure also relates to a vehicle seat assembly comprising such a slider or such a slider device and to a motor vehicle comprising such a vehicle seat assembly.

SUMMARY

According to the present disclosure, a slider for a vehicle seat, in particular for a motor vehicle seat, comprises a first profile section and a second profile section, the first profile section being movable in translation along a longitudinal direction of the seat, relative to the second profile section, the second profile section being intended to be fixed, under a floor of a vehicle passenger compartment and a slider actuator controlling the movement of the first profile section relative to the second profile section, the slider actuator comprising a motor intended to be arranged above the floor of the vehicle passenger compartment, and a reduction mechanism, the reduction mechanism comprising a belt, preferably notched, intended to pass through a slot in the floor of the vehicle passenger compartment.

In illustrative embodiments, by making use of a belt, it is possible to implement a reduction mechanism having a bulk that is well suited to the position of the actuator motor above the floor of the passenger compartment. In particular, such a solution is less sensitive to the distance between the motor and the slider than existing solutions comprising only the gearing. In particular, a belt reduces the risk of noise appearing in the reduction mechanism.

In illustrative embodiments, the slider has one or more of the following features, alone or in combination:
- the reduction mechanism comprises a first gearing engagement element, preferably helical such as a worm screw, driven to rotate by the motor, and at least a first pinion, driven to rotate by the first gearing engagement element;
- the first gearing engagement element is driven to rotate by an output shaft of the motor, the output shaft preferably being adapted to extend along a substantially transverse direction of the vehicle seat;
- the first pinion is integral in rotation with a second pinion, the belt being mounted on the second pinion;
- the belt meshes with a third pinion intended to be located under the floor, the third pinion being capable of moving relative to a screw via a screw-nut connection between the third pinion and the screw, the third pinion preferably being coaxial with the screw;
- the third pinion is integral with a nut mounted to rotate freely on the screw, the third pinion being in particular produced as one piece with the nut;
- the first gearing engagement element is capable of rotating about a first axis, the first pinion is capable of rotating about a second axis, and the third pinion is capable of rotating about a third axis, the first axis being arranged between the second axis and the third axis;
- the slider comprises means for tensioning the belt;
- the means for tensioning the belt comprise at least one roll, preferably at least one pair of rolls, in particular arranged in parallel, the means for tensioning the belt preferably also having two pairs of rolls arranged in parallel two by two;
- the second pinion is capable of rotating about a second axis and the third pinion is capable of rotating about a third axis, the means for tensioning the belt comprising at least two rolls, each roll extending along a respective main direction of extension, and, in a cross-sectional view, the projection of the axes of extension of the rolls are offset relative to one another along the direction from the second axis to the third axis;
- the position of the roll, preferably of the rolls, where appropriate, is adjustable, in particular along a transverse direction of the vehicle seat, by means of at least one screw and/or at least one spring, in particular at least one coil spring;
- the belt has a first portion that substantially forms an arc of a circle, and a second portion that substantially forms an arc of a circle, the belt forming two rectilinear lengths, preferably substantially parallel, between the first and second portions; and
- the distance between the two rectilinear lengths is less than the radius of curvature of the first portion of the belt and/or the radius of curvature of the second portion of the belt.

In illustrative embodiments, a slider device is described comprising a first slider as described above, in any of its combinations, and a second slider with a second pair of profile sections that are movable relative to each other, the slider actuator also controlling the relative movement of the second pair of profile sections, the motor preferably being arranged between the two pairs of profile sections.

Also described is a motor vehicle seat assembly comprising a seating portion, the seating portion being carried by at least one slider as described above in any of its combinations, or by a slider device as described above in any of its combinations.

Finally, also described is a vehicle, in particular a motor vehicle, comprising a chassis, a passenger compartment with a floor, and a seat assembly as described above in any of its combinations, vehicle in which the profile sections of the slider or sliders are under the floor of the passenger compartment and the motor of the slider actuator is above the floor of the passenger compartment.

In illustrative embodiments, the floor of the passenger compartment has a slot allowing the passage of the belt, the slot having in particular a width greater than or equal to 5 mm, preferably greater than or equal to 10 mm, and less than or equal to 40 mm, preferably less than or equal to 20 mm.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
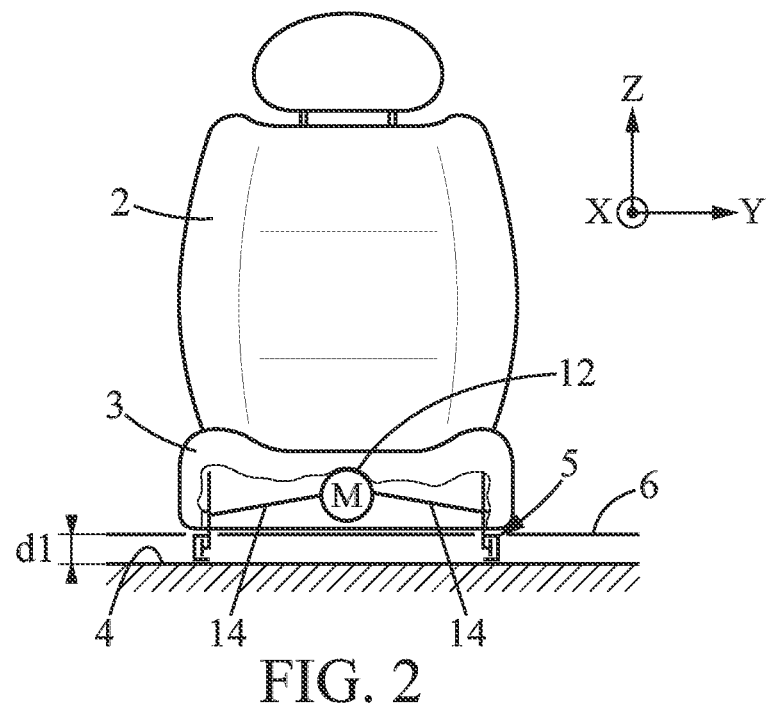
Figure 3:
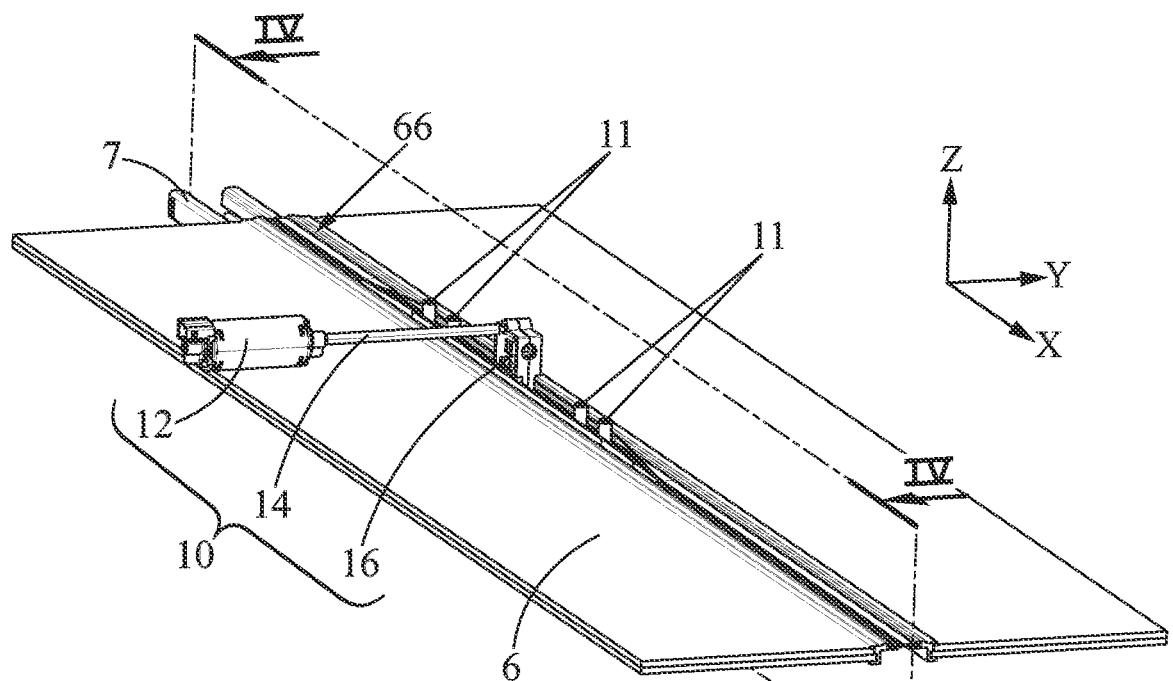
Figure 4:
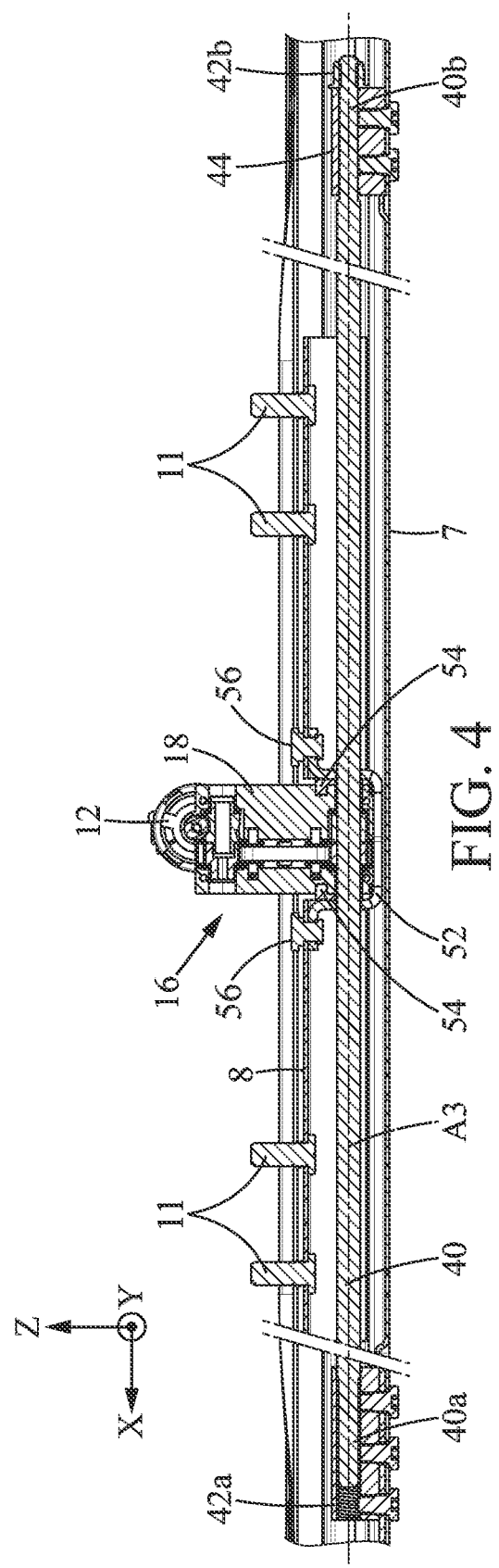
Figure 5:
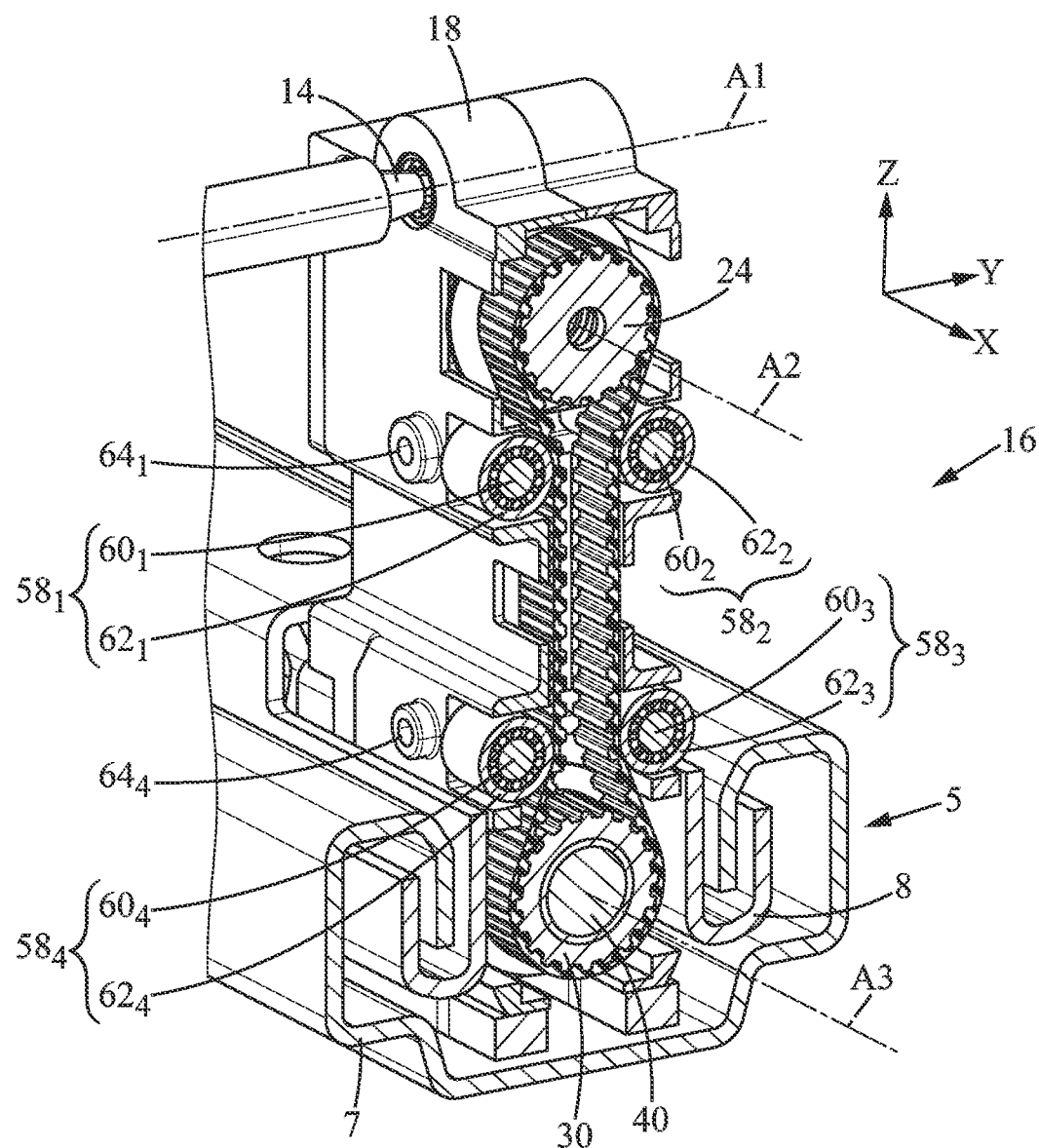
Figure 6:
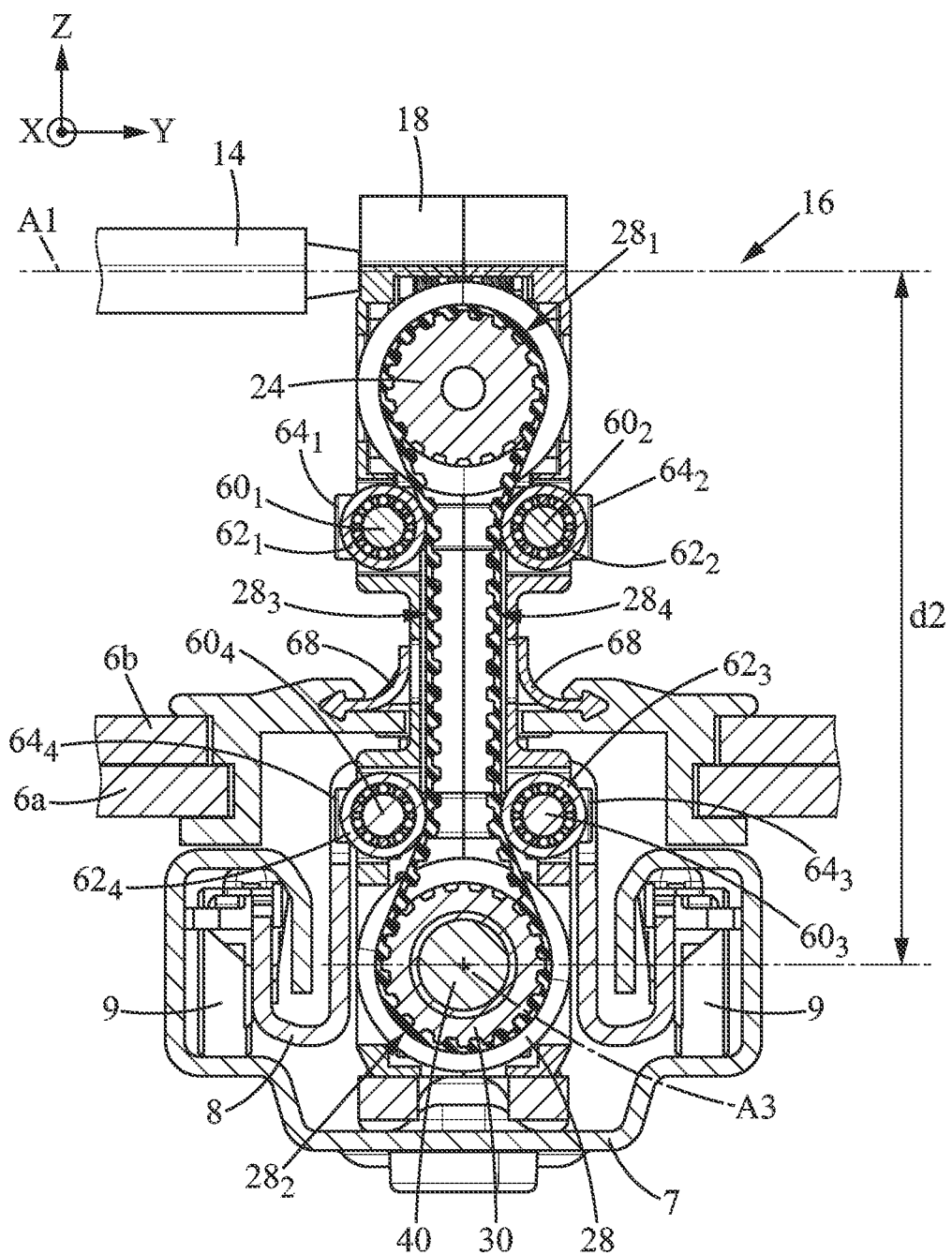
Figure 7:
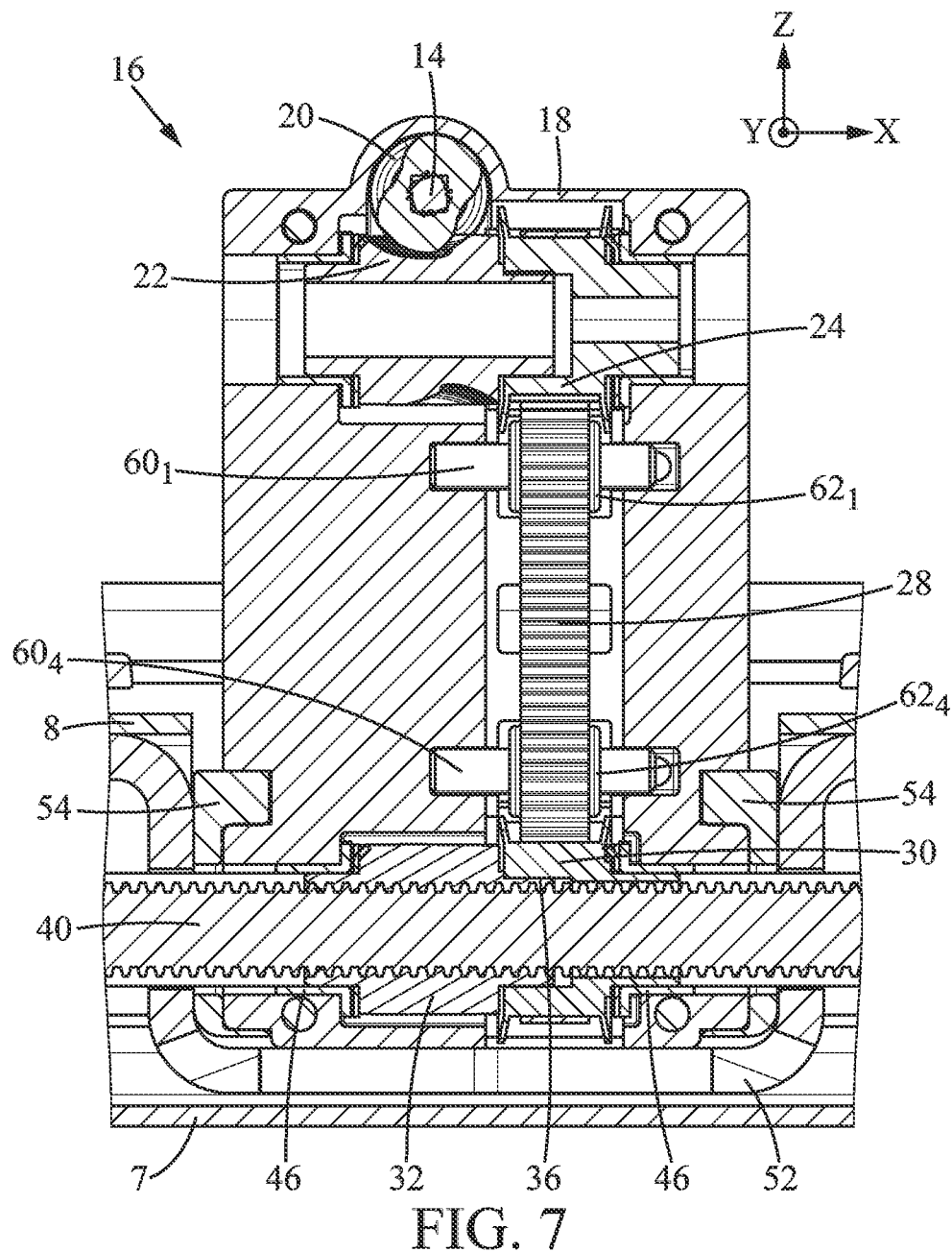
Figure 8:
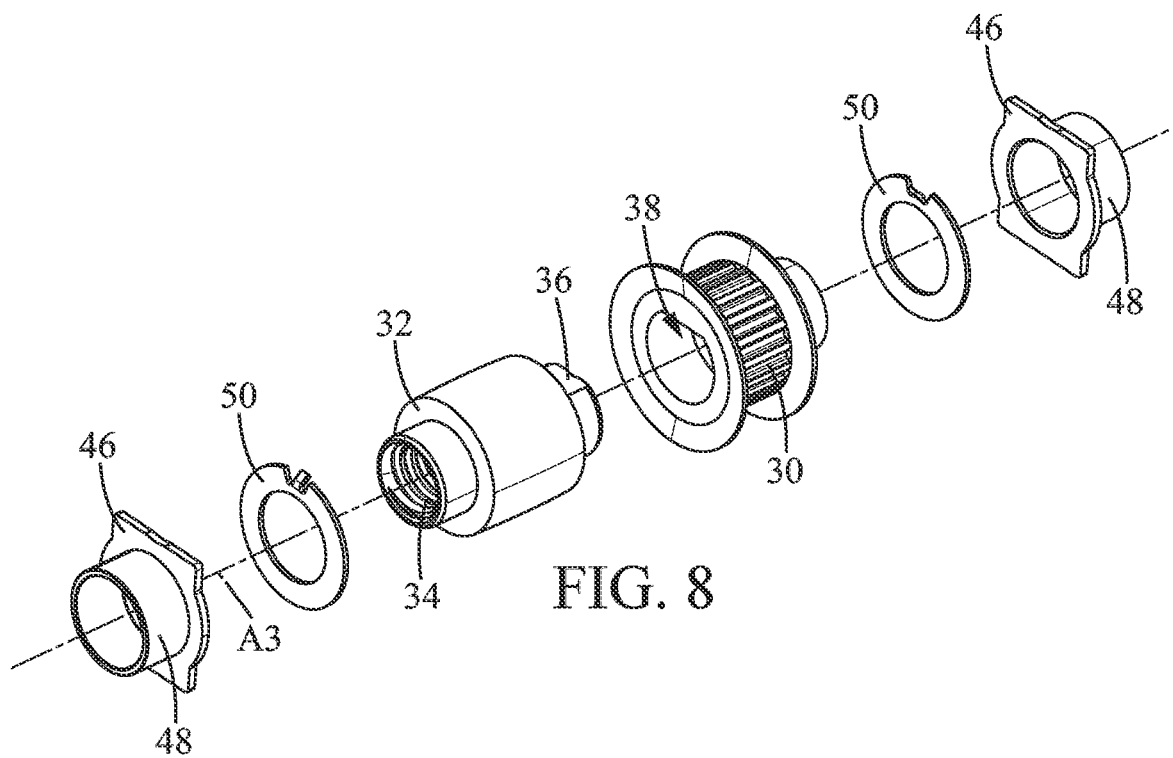
Figure 9:
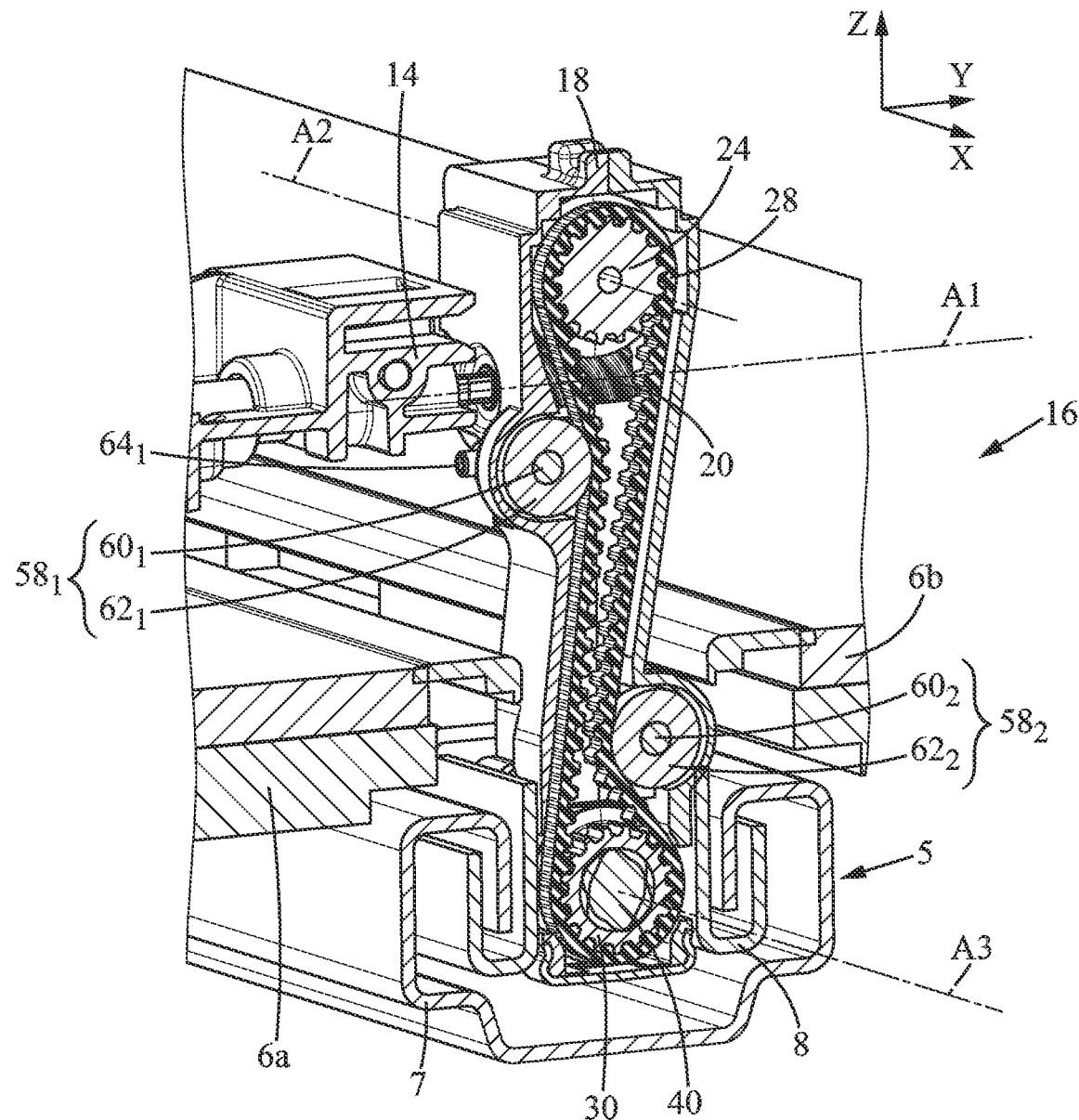
Figure 10:
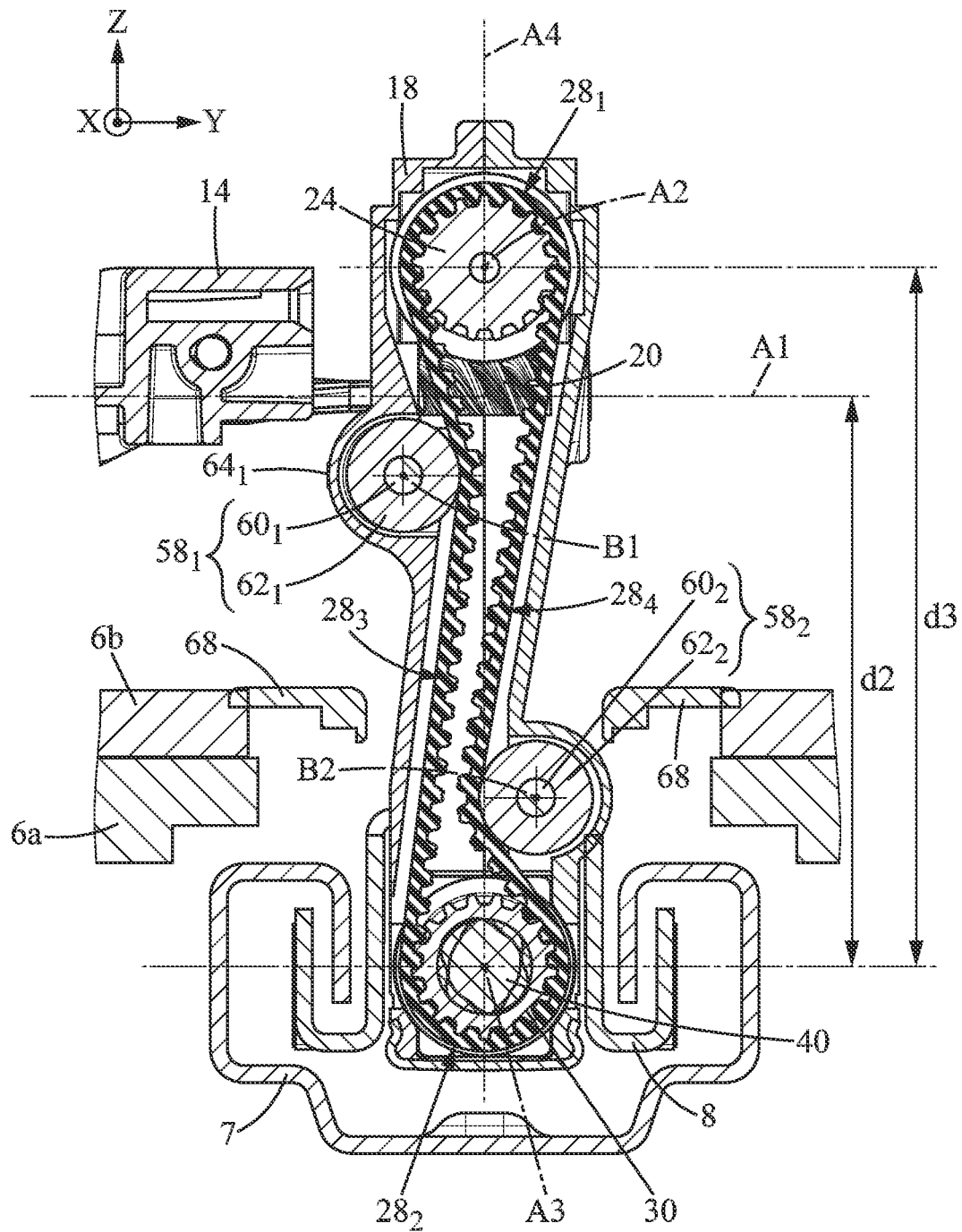
Figure 11:
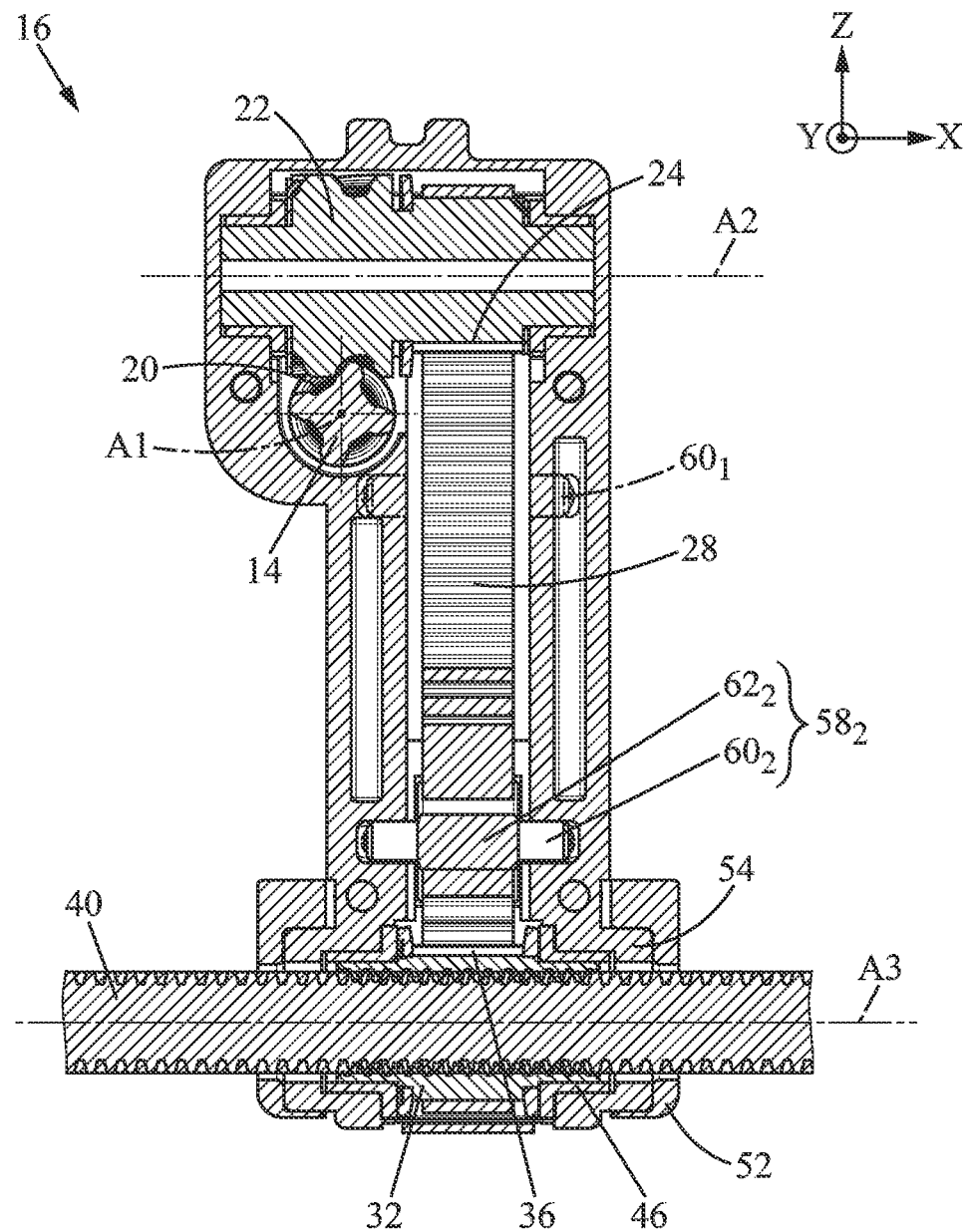

The detailed description particularly refers to the accompanying figures in which:

FIG. 1 schematically represents a side view of an example of a vehicle seat mounted in a vehicle;

FIG. 2 schematically represents a front view of an example of a vehicle seat assembly comprising the vehicle seat of FIG. 1;

FIG. 3 schematically represents, in a perspective view, details of the slider actuator used in the seat assembly of FIG. 2;

FIG. 4 schematically represents a section view along IV-IV of FIG. 3, of a slider used in the vehicle seat assembly of FIG. 2;

FIG. 5 schematically represents a first detailed section view of the slider of FIG. 4;

FIG. 6 schematically represents a second detailed section view of the slider of FIG. 4;

FIG. 7 schematically represents a third detailed section view of the slider of FIG. 4;

FIG. 8 is a schematic exploded view of a subassembly of the slider used in the seat assembly of FIG. 2;

FIG. 9 schematically represents a first section view of details of a second example of the slider;

FIG. 10 schematically represents a second section view of details of the second example of the slider; and FIG. 11 schematically represents a third section view of details of the second example of the slider.

DETAILED DESCRIPTION

In the various figures, the same references designate elements that are identical or have identical functions.

For conciseness, only those elements useful to understanding the described embodiments are shown in the figures and/or are described in detail below. In particular, the locking mechanisms have not been represented and are not described below, the described embodiment being compatible with the suitable mechanisms.

In the following description, when referring to absolute position qualifiers, such as the terms "front", "rear", "top", "bottom", "left", "right", etc., or relative qualifiers, such as the terms "above", "below", "upper", "lower", etc., or to orientational qualifiers, such as "horizontal", "vertical", etc., unless otherwise specified these are in reference to the orientation of the figures or of a seat in its normal position of use.

In the following, the longitudinal direction X means the longitudinal direction of the seat. The longitudinal direction of the seat is considered to be the same as the longitudinal direction of the motor vehicle in which the seat is mounted. This longitudinal direction X corresponds to the normal direction of travel of the vehicle. The longitudinal direction X is horizontal. The transverse direction Y is the transverse direction of the seat. The transverse direction of the seat thus corresponds to the transverse or lateral direction of the motor vehicle. This transverse direction corresponds to a direction perpendicular to the normal direction of travel of the vehicle. The transverse direction Y is also horizontal. Finally, the vertical direction Z is a vertical direction of the seat, perpendicular to the longitudinal and transverse directions.

FIG. 1 and FIG. 2 represent a motor vehicle seat 1 which comprises a backrest 2 carried by a seating portion 3. The seating portion 3 is mounted so as to slide on the chassis 4 (or body) of the vehicle along the longitudinal direction X. In particular, the seating portion 3 is mounted so as to slide on the bottom of the chassis 4 of the vehicle. Here, the chassis 4, in particular the bottom of the chassis 4, of the vehicle is covered by a floor 6 of the passenger compartment. The distance d1 between the bottom of the chassis 4 and the floor 6 of the passenger compartment may in particular be greater than or equal to 30 mm, preferably 40 mm, and/or less than or equal to 100 mm, preferably 75 mm.

The seating portion 3 is connected to the chassis 4 by two parallel sliders 5, extending along the longitudinal direction X. Here the sliders 5 are concealed under the floor 6 of the passenger compartment.

As can be seen in particular in FIG. 6, the floor 6 of the passenger compartment may comprise a frame 6a covered with decorative means 6b for the frame 6a, such as carpet for example.

Each of the two sliders 5 comprises a first slide element 7 and a second slide element 8 mounted so as to slide on the first slide element 7 along the longitudinal direction X. These first and second slide elements 7, 8 are connected one to the chassis 4 of the vehicle, the other to the seating portion 3.

Rolling elements 9, such as balls or rollers for example, may be arranged between the first and second slide elements 7, 8, to facilitate their relative movements.

The first slide element 7 may be a profile section, for example of metal. The first slide element 7 may form a rail called a "fixed rail".

Similarly, the second slide element 8 may be a profile section, for example of metal. The second slide element 8 may also form a rail, called a "moving rail". The seating portion 3 of the vehicle seat 1 may be fixed on the moving rail 8, for example via attachment rods 11. These attachment rods 11 may be received in feet of the seating portion 3.

Here, the movement of the movable rails 8 of the two sliders 5 associated with the seat 1 is carried out by means of a single slider actuator 10. A bidirectional control button B may be provided, for example on the seat 1, to control the slider actuator 10.

As can be seen in particular in FIG. 2, the slider actuator 10 here comprises a single motor 12 and two output shafts 14 of the motor 12, each output shaft 14 driving an associated reduction mechanism 16. As can be seen in particular in FIG. 2, the motor 12 is arranged above the floor 6 of the passenger compartment in order to facilitate the movements of the motor 12 and any maintenance. The motor 12 is further arranged between the rails 7, 8 of the two sliders 5. Thus the output shafts 14 extend substantially along the transverse direction Y of the vehicle seat 1.

Here, the two reduction mechanisms 16 are identical or symmetrical. For conciseness in this description, a single reduction mechanism 16 is described below, with reference to FIGS. 5 to 8 in particular.

The reduction mechanism 16, as illustrated, is received in a casing 18. The casing 18 is for example made of plastic.

Within the casing 18, the reduction mechanism 16 firstly comprises a first gearing engagement element 20. The first gearing engagement element is preferably a helical gearing engagement element, in particular a gearing engagement element with a helical thread such as a first worm screw 20, as in the example illustrated. The first screw 20 extends substantially along the transverse direction Y of the seat 1. The first screw 20 is driven to rotate about its axis A1, here transverse, by the output shaft 14. For example, the first screw 20 is integral in rotation with the output shaft 14, or even is mounted directly on the output shaft 14.

The first screw 20 engages a first pinion 22. Here, the axis A2 of the first pinion 22 extends parallel to the longitudinal direction X of the seat 1.

The first pinion 22 here is integral in rotation with a second pinion 24. Here, the first and second pinion 22, 24 are mounted to be fixed in rotation relative to each other, by a flat surface of one among the first and second pinions 22, 24 being received in a complementary housing of the other among the first and second pinions 22, 24. Alternatively, the first and second pinions 22, 24 may form a single piece. In other words, the first and second pinions 22, 24 may be integrally formed with the same material. The first and second pinions 22, 24 may also be fixed in rotation on a common shaft. Other assemblies are accessible to those skilled in the art. The first and second pinions 22, 24 may have the same radius or have different radii and therefore different numbers of teeth.

Here, the second pinion 24 meshes with a belt 28. The belt 28 is preferably notched, for example in order to limit or even prevent slippage of the belt 28 relative to the second pinion 24 and to a third pinion 30.

The third pinion 30 is integral in rotation with a nut 32, here around an axis A3 parallel to the longitudinal direction X of the vehicle seat 1. The nut 32 has a thread 34. To secure the nut 32 and the third pinion 30, the nut 32 has a flat surface 36, received inside a complementary housing 38 formed in the third pinion 30. Alternatively, the third pinion 30 and the nut 32 are formed as one and the same piece. In other words, the third pinion 30 and the nut 32 are integrally formed with the same material. According to one particular example of such an embodiment, the third pinion 30 comprises a thread 34, such that the third pinion 30 forms the nut 32. In such a case, the thread 34 can extend at the same level as the teeth of the third pinion 30, along the direction of the axis of rotation of the third pinion 30. Such an embodiment seems particularly compact.

A second screw 40 is received in the nut 32, and, here, in the pinion 30. The second screw 40 extends along the axis A3 of rotation of the third pinion 30. The second screw 40 is screwed into the nut 32 by means of the thread 34. In contrast, the second screw 40 passes through the third pinion 30 without being fixed to this third pinion 30, the third pinion 30 not having a thread in the example illustrated. Thus, the third pinion 30 is connected to the second screw 40 by a screw-nut connection. The axis of rotation of the third pinion 30 and of the nut 32 is coincident here with the axis A3 of the second screw 40, corresponding to the axis of the screw-nut connection.

Alternatively, however, one can imagine a third pinion 30 having a thread 34 for screwing the second screw 40 therein. In this case, the third pinion 30 also forms the nut 32. The thread 34 and the teeth can then be offset axially, meaning along the direction of the axis of rotation of the third pinion 30. Alternatively, however, in this case, the thread 34 and the teeth of the third pinion 30 are at least partially superimposed along the direction of the axis of rotation of the third pinion 30. The production of the third pinion 30 and nut 32 as two separate parts may appear preferred, however, because of the greater ease of manufacture.

As can be seen in particular in FIG. 6, the third pinion 30 is preferably located under the floor 6 of the motor vehicle, in particular vertically under the upper surface of the floor 6 oriented towards the passenger compartment of the vehicle. Even more preferably, the third pinion 30 is arranged under the lower surface of the floor 6, opposite to the upper surface of the floor 6. Preferably, as can be seen in FIGS. 6 and 7, this also applies to the nut 32 and/or to the second screw 40.

The distance d2 between the axis A1 of rotation of the first worm screw 20 and the axis A3 of rotation of the second screw 40 is for example greater than or equal to 40 mm, preferably greater than or equal to 45 mm. The distance d2 is measured along the vertical direction Z. The distance d2 is for example substantially equal to 65 mm.

The second screw 40 is fixed to the fixed rail 7 of the slider 5. Thus, as can be seen in particular in FIG. 4, a first end 40a of the second screw 40 is tightly mounted in a nut 42a fixed to the fixed rail 7. The second end 40b of the second screw 40 is received in a support 44 fixed to the fixed rail 7, a nut 42b preventing longitudinal displacement of the second screw 40 relative to the support 44.

As can be seen in particular in FIG. 8, the assembly formed by the third pinion 30 and the nut 32 is received in two bearings 46, each bearing 46 having a cylindrical portion 48. The cylindrical portion 48 of each bearing 46 is received in a complementary housing of the casing 18. Spring washers 50 are interposed between the nut 32 and third pinion 30 on the one hand and the associated bearing 46 on the other hand. This ensures that the third pinion 30 is held in position, notably in the casing 18, in particular with respect to the belt 28.

The casing 18 is here received in a cradle 52. Shims 54 may be used to lock the casing 18 in the cradle 52, in particular along the longitudinal direction X. The cradle 52 is fixed to the movable rail 8. For example, the cradle 52 is fixed to the movable rail 8 by means of pins 56. Additionally or alternatively, the cradle 52 may be riveted or screwed onto the movable rail 8.

The slider actuator 10 operates as follows. The rotation of the motor 12 causes rotation of the nut 32, the speed of rotation of the nut 32 being reduced relative to the speed of the motor 12 by the reduction mechanism 16. In parallel, the torque supplied to the nut 32 is increased relative to the torque of the motor 12. Rotation of the nut 32 around the second screw 40 causes translation of the movable rail 8 relative to this second screw 40 and therefore relative to the fixed rail 7. Indeed, the rotation of the nut 32 is not transmitted to the casing 18. Because the cradle 52 is fixed on the movable rail 8, it prevents rotation of the casing 18 relative to this movable rail 8 and therefore relative to the fixed rail 7 and the second screw 40.

Advantageously, the internal thread 34 of the nut 32 is non-reversible. Thus, the forces applied to the nut 32 in the event of an impact are not transmitted to the belt 28. This allows reduced design needs for the belt 28.

Furthermore, in the example shown, means for tensioning the belt 28 are provided in the casing 18. This limits a loss of torque during possible elongation of the belt 28, in the event of wear or variation in length with the ambient temperature.

Here, the means for tensioning the belt 28 comprise four rolls $58_1$-$58_4$. Here, each roll $58_1$-$58_4$ is rotating. In one example, the belt 28 comprises only four rolls $58_1$-$58_4$. According to the example illustrated, each roll $58_1$-$58_4$ thus comprises a support shaft $60_1$-$60_4$, on which is mounted a bearing $62_1$-$62_4$ in contact with the belt 28. Here, the bearings $62_1$-$62_4$ are needle bearings, but other types of bearings may be used. The four shafts $60_1$-$60_4$ are arranged in parallel such that the four rolls $58_1$-$58_4$ are parallel. The four rolls $58_1$-$58_4$ can be considered as two pairs of two rolls, each pair vertically arranged at the same height. By adjusting the distance, measured in the transverse direction Y of the seat 1, between two rolls $58_1$-$58_4$ of a same pair of rolls $58_1$-$58_4$, it is possible to adjust the tension of the belt 28.

The distance between two rolls $58_1$-$58_4$ of a same pair of rolls may, for example, be adjusted by means of screws $64_1$-$64_4$, or punch screws. The screws $64_1$-$64_4$ are for example received in corresponding holes in the casing 18 such that the screwing or unscrewing of the screws $64_1$-$64_4$ moves a respective shaft $60_1$-$60_4$. Springs (not shown in the figures) may also be used to keep the shaft $60_1$-$60_4$ in contact with the associated screw $64_1$-$64_4$. The springs may in particular be coil springs.

According to another variant, the distance between the rolls $58_1$-$58_4$ of a same pair of rolls is self-adjusting, for example by means of springs. To achieve this, the shaft $60_1$-$60_4$ of each roll $58_1$-$58_4$ may for example be elastically biased by two opposing springs.

Other variants are accessible to those skilled in the art. Thus, for example, the distance between two rolls $58_1$-$58_4$ of a same pair of rolls may be adjusted by means of a single screw $64_1$-$64_4$ acting on only one of the two rolls $58_1$-$58_4$ of the pair of rolls. In this case, the other roll $58_1$-$58_4$ of the pair of rolls may be fixed. Alternatively, displacement of the screw $64_1$-$64_4$ controls a displacement of the two rolls $58_1$-$58_4$ of the pair of rolls, for example by means of a spring device.

Here, the presence of four rolls $58_1$-$58_4$ makes it possible to obtain a particularly advantageous configuration of the belt 28. Indeed, as can be seen in particular in FIG. 6, the belt 28 thus has a first portion $28_1$ that substantially forms an arc of a circle, a second portion $28_2$ that substantially forms an arc of a circle, and a third portion $28_3$, between the first and second portions $28_1$, $28_2$, in which the belt 28 forms two rectilinear lengths $28_3$, $28_4$. The two rectilinear lengths $28_3$, $28_4$ may in particular be parallel. Preferably, the distance between the two rectilinear lengths $28_3$, $28_4$ is less than the radius of each of the first and second portions $28_1$, $28_2$ of the belt 28. It is thus possible to limit the size of the belt 28 where the belt 28 passes through the floor 6 of the passenger compartment. It is thus possible to provide a slot 66 of reduced width in the floor 6 of the passenger compartment. For example, the width of the slot 66 in the floor 6 of the passenger compartment is greater than or equal to 5 mm, preferably 10 mm, and/or less than or equal to 40 mm, preferably 20 mm. However, relatively large radii of curvature are retained, which allows greater reduction in the reduction mechanism 16.

As can be seen in particular in FIG. 6, at least one roll $58_3$, $58_4$, here two rolls $58_3$, $58_4$, are arranged vertically under the upper surface of the floor 6 oriented towards the passenger compartment. More preferably, at least one roll $58_3$, $58_4$, even more preferably at least two rolls $58_3$, $58_4$, are arranged vertically under the lower surface of the floor 6, opposite to the upper surface of the floor 6.

Lips 68 may further be provided to cover the slot 66, which open and close according to whether the casing 18 is passing through. This further improves the aesthetics of the floor 6 of the passenger compartment.

In the following, a second example of a reduction mechanism 16 that can be implemented in the slider 5 illustrated in FIGS. 3 and 4, is described with reference to FIGS. 9 to 11.

The reduction mechanism 16 of FIGS. 9 to 11 differs from the reduction mechanism described above, first of all by rolls $58_1$, $58_2$ of larger diameter than the rolls $58_1$-$58_4$ of the first example. Thus, the rolls $58_1$, $58_2$ according to this second example may for example have a diameter greater than 10 mm, for example substantially equal to 12 mm, while the rolls $58_1$-$58_4$ according to the first example have for example a diameter less than 10 mm, for example substantially equal to 8 mm. A larger diameter correspondingly reduces wear of the belt 28 in contact with the rolls $58_1$-$58_4$.

However, to facilitate the assembly of the rolls $58_1$, $58_2$, here of larger diameter, the first gearing engagement element 20, here the worm screw 20, is arranged vertically under the first pinion 22 in this second example of a reduction device.

In other words, the axis A1 of rotation of the worm screw 20 is arranged, vertically, between the axis of rotation A2 of the second pinion 22 driving the belt 28 and the axis A3 of rotation of the third pinion 40 driven by the belt 28. This can make it possible to increase the distance between the axis of rotation A2 of the second pinion 22 driving the belt 28 and the axis of rotation A3 of the third pinion 30 driven by the belt 28, possibly for a same vertical footprint of the reduction mechanism 16, in particular of the casing 18 of the reduction mechanism 16. Thus, in the second example illustrated, the belt 28 extends vertically over a greater distance than in the first example. It is thus possible, in the second example illustrated, to arrange rolls $58_1$, $58_2$ of larger diameter in locations where such rolls $58_1$, $58_2$ could not be arranged in the first described example of a reduction mechanism 16, without interfering with surrounding elements such as the floor 6 of the passenger compartment, for example.

Furthermore, in the second illustrated example, the reduction mechanism 16 comprises only two rolls $58_1$, $58_2$ for guiding the belt 20, making it possible to reduce the width of the belt 20 at the slot in the floor 6, i.e. the distance between the two rectilinear lengths $28_3$, $28_4$ at the slot in the floor 6, relative to the diameter of the second pinion 24 and of the third pinion 30 and/or to the diameters of the portions $28_1$, $28_2$ substantially forming an arc of a circle, of the belt 28. Here again, by limiting the number of rolls $58_1$, $58_2$ to two, the bulk of the reduction mechanism 16 is reduced for a given size of the rolls $58_1$, $58_2$. To further reduce the bulk of the reduction mechanism 16, in particular transversely, the rolls $58_1$, $58_2$ here are offset vertically relative to each other. More precisely, each roll $58_1$, $58_2$ extends mainly along a respective axis $B_1$, $B_2$, corresponding here to the axis of rotation of the roll $58_1$, $58_2$ considered. As can be seen in FIG. 10, in cross-sectional view, the projections of the axes $B_1$, $B_2$ of the rolls $58_1$, $58_2$ are offset on the axis $A_4$ connecting the second axis $A_2$ and the third axis $A_3$ in this cross-sectional view of FIG. 10.

In the example illustrated, two rolls $58_1$, $58_2$ are thus arranged to be offset from each other along the direction of the axis $A_4$ connecting the second and third axes $A_2$, $A_3$. However, more than two rolls $58_1$, $58_2$ may be arranged in this manner, offset relative to each other along axis $A_4$, in particular three rolls, four rolls, or even more than four rolls.

Here again, as can be seen in FIG. 9 for example, at least one roll $58_2$, here a single roll $58_2$, is arranged vertically under the floor, in particular under the upper surface of the floor 6 oriented towards the passenger compartment of the vehicle. Preferably again, the at least one roll $58_2$, even more preferably the single roll $58_2$, is arranged vertically under the lower surface of the floor 6, opposite to the upper surface of the floor 6.

In all cases, at least one roll $58_1$, $58_2$ is preferably in contact with each of the rectilinear lengths $28_3$, $28_4$, to limit vibrations in the rectilinear lengths $28_3$, $28_4$ and in the belt 28.

In the examples described, the reduction mechanism comprises a first pinion and a second pinion. Alternatively, the reduction mechanism may comprise only a first pinion between the first gearing engagement element and the belt. In this case, it is this first pinion, driven by the first gearing engagement element, which in turn drives the belt.

Furthermore, the means for tensioning the belt 28 comprise four rolls $58_1$-$58_4$ in the first example shown, and two rolls $58_1$, $58_2$ in the second example shown. Alternatively, these means for tensioning the belt may comprise only two rolls $58_1$-$58_4$, in the first example, or even just one roll.

Similarly, in the second example described, the reduction mechanism 16 may comprise only one roll $58_1$. However, as described above, at least two rolls are preferred, each in contact with a respective rectilinear length $28_3$, $28_4$ of the belt 28.

Also, the rolls $58_1$-$58_4$ are not necessarily of circular cross-section, nor are they necessarily rotatable. The rolls $58_1$-$58_4$ may thus, for example, have the shape of fixed angular section of a cylinder. Preferably, however, the portion of the rolls $58_1$-$58_4$ in contact with the belt 28 has a rounded shape, to limit wear of the belt 28.

The rolls $58_1$-$58_4$ may also take other forms accessible to those skilled in the art. In particular, each roll $58_1$-$58_4$ may be or may comprise a guide roller.

In the examples shown, the same slider actuator is used to control the two sliders of a vehicle seat assembly. Alternatively, one slider actuator may be used to control one slider. In this case, it is preferable to provide means for synchronizing two slider actuators of a vehicle seat assembly. In all cases, the motor or motors are preferably arranged under the vehicle seat so that the output shaft of each motor extends substantially transversely relative to the vehicle seat.

Finally, the examples shown are particularly suitable for what is referred to as a "second row" vehicle seat, meaning a passenger vehicle seat in the second row of seats, behind the first row of seats which comprises the driver's seat. The slider 5 described allows in particular obtaining a length of travel of between 600 and 800 mm, without impacting the aesthetics of the passenger compartment. However, the slider described could also be implemented in a "first row" vehicle seat—therefore in particular the driver's seat—or in a seat in a row greater than two, where applicable.

A vehicle seat, in particular of a motor vehicle, is may be fixed to the chassis (or body) of the vehicle via sliders which allow adjusting the longitudinal position of the seat. This arrangement aims to improve the comfort of the seat's occupant, who can adapt the position of the seat to their height, in particular to the length of their legs. Until now, longitudinal adjustment of the seat position has been limited. Comparative sliders used are therefore relatively short, generally shorter than the length of the vehicle seat. Under these conditions, the comparative sliders are concealed under the vehicle seat itself.

However, in autonomous vehicles in particular, the range of adjustment of the longitudinal position of a seat can be increased. In some cases, sliders longer than the vehicle seat may be used. In this case in particular, the sliders may be visible to the vehicle's occupants, at least in certain positions of the seat. This is unsightly. Such a configuration also leads to the risk of foreign bodies falling into the sliders. These foreign bodies can interfere with the proper operation of the slides. Also, the stiletto heels of shoes, for example, can become stuck in a slider, from which they cannot be removed without being damaged.

More recently, it has been proposed to fix the sliders to the chassis of the vehicle and to hide the runners under the floor of the passenger compartment, which at least at certain points is at a distance from the chassis, in particular from the bottom of the chassis. This greatly improves the aesthetics of the passenger compartment and reduces the risks mentioned above.

Fixed slider actuators for controlling the sliders have then been proposed. However, these solutions are not suitable for the long travel path of the sliders, in particular in autonomous vehicles, and for the corresponding speeds.

However, when the actuator is movable, it is often too bulky for placement between the chassis and the floor of the passenger compartment. In addition, locating the actuator between the chassis and the floor of the passenger compartment can restrict the movement of the actuator. This arrangement also makes maintenance of the actuator more difficult.

As a result, it has been proposed to place at least the actuator motor above the chassis of the passenger compartment, in particular under the seat. However, in this case it is necessary to make use of gearing with larger and therefore bulkier pinions. Alternatively, gearing may be provided with more pinions than the comparative solutions. In this case, however, backlash may occur between the pinions, which can cause premature gear wear and/or noise.

In all cases, the proposed solutions which make use of gearing use a relatively wide slot in the floor of the passenger compartment, to allow the passage of the gears. This is detrimental to the aesthetics of the passenger compartment and once again makes it possible for foreign bodies to fall into the sliders, although they are concealed under the floor of the passenger compartment.

The present description aims to resolve at least some of the above issues.

To this end, this disclosure proposes a slider for a vehicle seat, in particular for a motor vehicle seat, comprising:
- a first profile section and a second profile section, the first profile section being movable in translation along a longitudinal direction of the seat, relative to the second profile section, the second profile section being intended to be fixed, under a floor of a vehicle passenger compartment,
- a slider actuator controlling the movement of the first profile section relative to the second profile section, the slider actuator comprising a motor intended to be arranged above the floor of the vehicle passenger compartment, and a reduction mechanism, the reduction mechanism comprising a belt, preferably notched, intended to pass through a slot in the floor of the vehicle passenger compartment.

Thus, advantageously, by making use of a belt, it is possible to implement a reduction mechanism having a bulk that is well suited to the position of the actuator motor above the floor of the passenger compartment. In particular, such a solution is less sensitive to the distance between the motor and the slider than existing solutions comprising only the gearing. In particular, a belt reduces the risk of noise appearing in the reduction mechanism.

Preferably, the slider has one or more of the following features, alone or in combination:
- the reduction mechanism comprises a first gearing engagement element, preferably helical such as a worm screw, driven to rotate by the motor, and at least a first pinion, driven to rotate by the first gearing engagement element;
- the first gearing engagement element is driven to rotate by an output shaft of the motor, the output shaft preferably being adapted to extend along a substantially transverse direction of the vehicle seat;
- the first pinion is integral in rotation with a second pinion, the belt being mounted on the second pinion;
- the belt meshes with a third pinion intended to be located under the floor, the third pinion being capable of moving relative to a screw via a screw-nut connection between the third pinion and the screw, the third pinion preferably being coaxial with the screw;
- the third pinion is integral with a nut mounted to rotate freely on the screw, the third pinion being in particular produced as one piece with the nut;

the first gearing engagement element is capable of rotating about a first axis, the first pinion is capable of rotating about a second axis, and the third pinion is capable of rotating about a third axis, the first axis being arranged between the second axis and the third axis;

the slider comprises means for tensioning the belt;

the means for tensioning the belt comprise at least one roll, preferably at least one pair of rolls, in particular arranged in parallel, the means for tensioning the belt preferably also having two pairs of rolls arranged in parallel two by two;

the second pinion is capable of rotating about a second axis and the third pinion is capable of rotating about a third axis, the means for tensioning the belt comprising at least two rolls, each roll extending along a respective main direction of extension, and, in a cross-sectional view, the projection of the axes of extension of the rolls are offset relative to one another along the direction from the second axis to the third axis;

the position of the roll, preferably of the rolls, where appropriate, is adjustable, in particular along a transverse direction of the vehicle seat, by means of at least one screw and/or at least one spring, in particular at least one coil spring;

the belt has a first portion that substantially forms an arc of a circle, and a second portion that substantially forms an arc of a circle, the belt forming two rectilinear lengths, preferably substantially parallel, between the first and second portions; and the distance between the two rectilinear lengths is less than the radius of curvature of the first portion of the belt and/or the radius of curvature of the second portion of the belt.

According to another aspect, a slider device is described comprising a first slider as described above, in any of its combinations, and a second slider with a second pair of profile sections that are movable relative to each other, the slider actuator also controlling the relative movement of the second pair of profile sections, the motor preferably being arranged between the two pairs of profile sections.

Also described is a motor vehicle seat assembly comprising a seating portion, the seating portion being carried by at least one slider as described above in any of its combinations, or by a slider device as described above in any of its combinations.

Finally, also described is a vehicle, in particular a motor vehicle, comprising a chassis, a passenger compartment with a floor, and a seat assembly as described above in any of its combinations, vehicle in which the profile sections of the slider or sliders are under the floor of the passenger compartment and the motor of the slider actuator is above the floor of the passenger compartment.

Preferably, the floor of the passenger compartment has a slot allowing the passage of the belt, the slot having in particular a width greater than or equal to about 5 mm, preferably greater than or equal to about 10 mm, and less than or equal to about 40 mm, preferably less than or equal to about 20 mm.

The invention claimed is:

1. A slider for a vehicle seat comprising:

a first profile section and a second profile section, the first profile section being movable in translation along a longitudinal direction of the seat, relative to the second profile section, the second profile section being intended to be fixed, under a floor of a vehicle passenger compartment and a slider actuator controlling the movement of the first profile section relative to the second profile section, the slider actuator comprising a motor intended to be arranged above the floor of the vehicle passenger compartment, and a reduction mechanism, the reduction mechanism comprising a belt intended to pass through a slot in the floor of the vehicle passenger compartment, wherein the reduction mechanism comprises a first gearing engagement element driven to rotate by the motor, and at least a first pinion, driven to rotate by the first gearing engagement element, wherein the belt meshes with a third pinion intended to be located under the floor, the third pinion being capable of moving relative to a screw via a screw-nut connection between the third pinion and the screw, and wherein the first gearing engagement element is capable of rotating about a first axis, the first pinion is capable of rotating about a second axis, and the third pinion is capable of rotating about a third axis, the first axis being arranged between the second axis and the third axis.

2. The slider of claim 1, wherein the reduction mechanism comprises a first gearing engagement element driven to rotate by the motor, and at least a first pinion, driven to rotate by the first gearing engagement element.

3. The slider of claim 2, wherein the first gearing engagement element is driven to rotate by an output shaft of the motor.

4. The slider of claim 3, wherein the output shaft is adapted to extend along a substantially transverse direction of the vehicle seat.

5. The slider of claim 1, wherein the first pinion is integral in rotation with a second pinion, the belt being mounted on the second pinion.

6. The slider of claim 1, wherein the belt meshes with a third pinion intended to be located under the floor, the third pinion being capable of moving relative to a screw via a screw-nut connection between the third pinion and the screw).

7. The slider of claim 6, wherein the third pinion is coaxial with the screw.

8. The slider of claim 6, wherein the third pinion is integral with a nut mounted to rotate freely on the screw.

9. The slider of claim 1, comprising means for tensioning the belt.

10. The slider of claim 9, wherein the means for tensioning the belt comprise at least one roll.

11. The slider of claim 10, wherein the position of the roll is adjustable by means of at least one among at least one screw, at least one spring, and at least one coil spring.

12. The slider of claim 1, wherein the belt has a first portion that substantially forms an arc of a circle, and a second portion that substantially forms an arc of a circle, the belt forming two rectilinear lengths between the first and second portions.

13. The slider of claim 12, wherein the distance between the two rectilinear lengths is less than at least one among the radius of curvature of the first portion of the belt and the radius of curvature of the second portion of the belt.

14. A motor vehicle seat assembly comprising a seating portion, the seating portion being carried by at least one slider according to claim 1.

15. A vehicle comprising a chassis, a passenger compartment with a floor, and the seat assembly of claim 14, vehicle in which the profile sections of the slider are under the floor of the passenger compartment and the motor of the slider actuator is above the floor of the passenger compartment.

16. The vehicle of claim 15, wherein the floor of the passenger compartment has a slot allowing the passage of the belt.

17. A slider device comprising the first slider according to claim 1, and a second slider with a second pair of profile sections which are movable relative to each other, the slider actuator also controlling the relative movement of the second pair of profile sections, the motor preferably being arranged between the two pairs of profile sections.

18. A slider for a vehicle seat comprising:
a first profile section and a second profile section, the first profile section being movable in translation along a longitudinal direction of the seat, relative to the second profile section, the second profile section being intended to be fixed, under a floor of a vehicle passenger compartment,
a slider actuator controlling the movement of the first profile section relative to the second profile section, the slider actuator comprising a motor intended to be arranged above the floor of the vehicle passenger compartment, and a reduction mechanism, the reduction mechanism comprising a belt intended to pass through a slot in the floor of the vehicle passenger compartment, and
means for tensioning the belt,
wherein the reduction mechanism comprises a first gearing engagement element driven to rotate by the motor, and at least a first pinion, driven to rotate by the first gearing engagement element, wherein the belt meshes with a third pinion intended to be located under the floor, the third pinion being capable of moving relative to a screw via a screw-nut connection between the third pinion and the screw, wherein the first pinion is capable of rotating about a second axis and the third pinion is capable of rotating about a third axis, the means for tensioning the belt comprising at least two rolls, each roll extending along a respective main direction of extension, and wherein, in a cross-sectional view, a projection of axes of extension of the rolls are offset relative to each other along a direction from the second axis to the third axis.

19. The slider of claim 18, wherein the reduction mechanism comprises a first gearing engagement element driven to rotate by the motor, and at least a first pinion, driven to rotate by the first gearing engagement element, wherein the belt meshes with a third pinion intended to be located under the floor, the third pinion being capable of moving relative to a screw via a screw-nut connection between the third pinion and the screw, and wherein the first gearing engagement element is capable of rotating about a first axis, the first pinion is capable of rotating about a second axis, and the third pinion is capable of rotating about a third axis, the first axis being arranged between the second axis and the third axis.

* * * * *